2,949,344

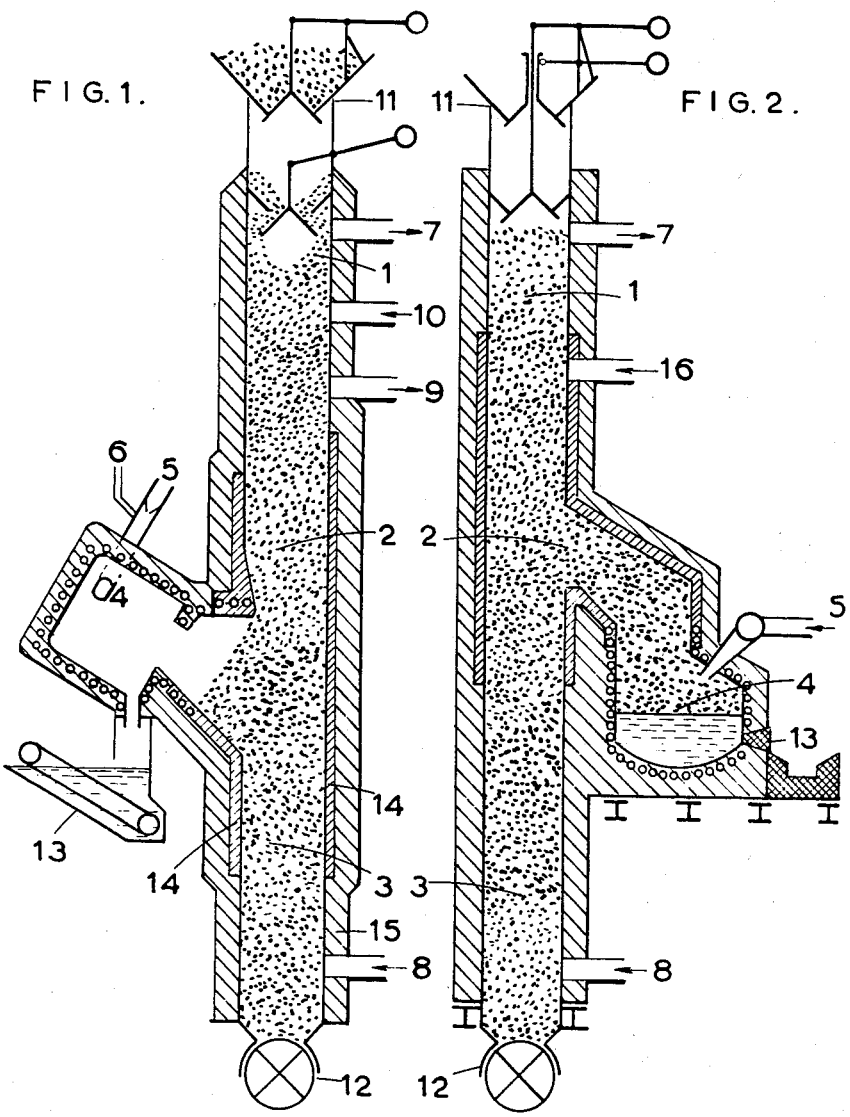

GRAPHITIZING RESIDUES OF THE THERMAL DECOMPOSITION OF CARBONACEOUS MATERIALS

Heinrich Macura, 3 Neckarstrasse, Essen, Ruhr, Germany

Filed Sept. 6, 1957, Ser. No. 682,521

5 Claims. (Cl. 23—209.1)

It is known that the residues of the thermal decomposition of solid, liquid or gasiform fuels, such as coke, soot or carbon black depending on the temperature to which they have been heated, contain more or less well-defined graphite crystallites, which impart a corresponding electric conductivity thereto. It is further known to mould such materials to bodies with carbon compounds, such as tars, pitches or the like and to heat these whilst they are surrounded with pulverulent coke. In this operation, the binding agent is coked and the volatile components are driven off, temperatures of 1500° C. being employed and the heating being carried out in a non-oxidizing atmosphere, if desired or required, under the protection of gases such as hydrogen, carbon monoxide, town gas or the like or hydro-carbon vapours.

Processes are further known in which such moulded bodies or their initial materials are heated to high temperatures in an electric resistance furnace, whereby they are converted to graphite.

The present process serves to impart a high grade of graphitization and a high electric conductivity to residues of the thermal decomposition of fuels, e.g. coke, soot or carbon black or moulded bodies produced therefrom, which products are then employed for the production of electrodes, construction material for metallurgical or chemical apparatus or the like.

To this end, these materials are heated further above their production temperature. In this operation, without the use of electric energy, it was hitherto only possible with great difficulty to exceed temperatures of 1500° C. because the creep strength of the ceramic materials employed is very limited. If, however, combustion gases from a furnace are employed for heating without a ceramic intermediate wall, they act, even if they contain no free oxygen as a gasification agent on the carbonaceous wall material or on the charge and consume it, thus enriching the ash therein and moreover, by the withdrawal of sensible heat for gasification, creating conditions under which the carbonaceous material does not attain a temperature corresponding to that of the combustion gases from the furnace. Even high combustion temperatures only have the effect that the gasification of the carbonaceous material becomes more vigorous and that more heat and material are consumed thereby, without the temperature of the material increasing correspondingly.

In accordance with the invention, the charge material is heated by hot combustible gases having a reducing action in a furnace containing a preheating zone, a heating zone and a cooling back zone, the said furnace being lined with a wall material which is resistant to reducing gases (e.g. carbon, silicon carbide or graphite) and the said gases being produced by reaction of oxygen with carbonaceous materials at at least 1600° C. in a gas producer directly communicating with the heating zone of the furnace. Depending on the type of gas producer, portions divided off from the carbonaceous charge material or other suitable solid, liquid or gasiform fuels are employed for the gasification or conversion.

The charge material is first introduced into the preheating zone which is heated by the combustible reducing gas coming from the gasifier directly connected with the heating zone and then flowing into the preheating zone of the furnace and that coming from the cooling back zone. Thereby, this gas is cooled down and heats the material travelling further towards the heating zone. The gas coming from the preheating zone, if desired or required, after being cooled down further and purified and after branching off a portion for use for any desired purpose, is introduced in a cold state into the cooling back zone of the furnace and is thus employed in a recirculation system. In the heating zone, the initial material coming from the preheating zone is heated to the highest temperature by addition of hot fresh gas from the gas producer and travels further into the cooling back zone. Here, cold gas flows countercurrent to it, which cools down the heated material, thereby being heated up, and is mixed in the heating zone with the hot fresh gas coming from the gas producer. A highly heated combustible gas having a reducing action is produced with a temperature exceeding 1600° C. in known manner by gasification or conversion of carbonaceous materials with oxygen in a gas producer, e.g. using a cyclone or vortex chamber in which the materials are maintained in a state of whirling motion or in a slagging gas producer, which is directly connected with the heating zone.

For preheating the gasification agents and, if desired or required, the gasification fuel, when using a fuel different from the initial material, the sensible heat of the gas coming from the preheating zone or gas branched off from the gas circulation and burned, is employed in heat exchange. The gas branched off from the gas circulation, which is rich in carbon monoxide and also in hydrogen may be employed in known manner, e.g. for the reduction of ores.

The heating with such hot combustible gases having a reducing action has the advantage that at least temperatures the gasification equilibrium or the conversion equilibrium is attained very rapidly during the production of the gas. On this account, the gases produced have only a negligible or no gasification action on the wall material of the furnace and on the charge therein. Thus they neither consume the one nor the other, even in long contact periods with the wall material or the charge. They are, therefore, also fully capable of completely transferring their sensible heat without the attainable exchange temperature being reduced by heat consuming gasification processes. In this manner, therefore, a very extensive graphitization occurs at the very high temperatures to which the carbonaceous initial material is subjected, because the rate of the formation of graphite crystallites or graphite crystals increases very rapidly above 1600° C.

It is of particular advantage in this operation if, during the recovery of the residues from the thermal decomposition of fuels, suitable measures are taken to secure as high a density and/or stratification as possible of the material to be subjected to graphitizing. Such measures may include coking of rammed briquettes, precompressed shaped bodies or of pressed thin flakes or discs of irregular periphery.

The resistance of the furnace walls against a gas which has been prepared in a gasification or conversion process carried out with proper precautions at a temperature above 1600° C. is adequate, but surprisingly enough, it increases further with further increased gasification temperatures, because the period for attaining the gasification equilibrium becomes constantly shorter. It was further found that, especially at temperatures very little above 1600° C., an attack on the furnace walls or the charge material may be further avoided by carrying out the gasification in such manner that a small amount of soot or carbon black is deposited from the gasification flame. This measure has a double effect. In so far as the soot or carbon black builds up directly on the surface or in the pores of the charge material in a boundary surface reaction, it increases the size of the graphite crystallites or crystals which are in the course of formation. If, however, it already comes into contact with the surface of the walls and of the charge material, in the form of solid particles, in case, in the gasification flame reaction, the time for completely attaining the gasification equilibrium has been inadequate, it has the effect, because of its large surface area and fine state of subdivision, that the gases flowing over its very large surfaces are given ample time for the attainment of the said equilibrium. The amount of this deposition of soot or carbon black is also adjusted according to the extent to which the gas coming from the gas producer has attained the gasification equilibrium or to the percentage of not completely converted gasification agents which is present. Since, however, as is well-known, the soot or carbon black produced in gasification flames can be gasified at low temperatures only with difficulty, this further emphasizes the desirability of employing a gasification temperature of over 1600° C. at which a change of position of the active centres of the surface of the carbonaceous material is already taking place, and at which such decomposition soot or carbon black is rapidly gasified.

It has further been found that in the gasification zone or conversion zone and in the transition portion of the heating zone of the furnace, carbon wall material which is resistant to reducing gases can only be employed at those points where gas, which is already in a state of gasification equilibrium, is present. At all points at which free gasification agents or gases are present, which are not yet in state of equilibrium, a wall material resistant to reduction and oxidation must be employed. For this purpose, water cooled tubes which are situated on or within the wall to protect the same, are employed in known manner. The advantage of the combination of carbon wall material with water-cooled walls resides in the fact that such high temperatures can be attained without too much heat being passed off and with an adequate creep resistance of the furnace material while employing the usual construction materials—i.e. the use of rare earths may be avoided or reduced to a minimum. Since at the high temperatures employed, especially when using fuels poor in ash and cooling tubes exposed to the interior of the furnace, a very considerable removal of heat takes place, materials having a high melting point and a low vapour pressure at these temperatures e.g. alumina, zirconia and the like are admixed with the fuel and/or the gasification agent from time to time. These produce a sintered or fused coating on the cooling tubes which considerably minimizes the transfer of heat, without appreciable amounts being vapourized as would otherwise be the case with the usual types of fuel ashes.

Should volatile substances, e.g. SiS, SiO, metal vapours or alkali metal compounds be formed during the heating, if their amount is in excess of that which can be removed in the form of an aerosol or of a vapour, they will deposit on the charge material and lead to a disturbance of smooth operation or an undesirable ash content. This danger can be mitigated by employing coking residues which, before being introduced into the furnace, have not been degassed to a too great extent. In this case, during the preheating, a gaseous atmosphere is formed around the individual particles which prevents any substantial deposits. Such an effect can, however, be easily attained, whenever desired, if small amounts of tars, pitches or the like are distributed on the surface of the particles so that they reduce the amount of the deposits by their degasification. If considerable amounts of such volatile compounds are produced, the gas containing them is passed out of the furnace and through a charge of granular material which cools it to a temperature adequate for the deposition of the volatile substances (e.g. 600°–700° C.) and purifies the gas. The gas thus purified which is still hot is returned to the furnace for further preheating.

In accordance with the invention, a gas containing such impurities is removed from the furnace with a temperature of about 800°–1000° C., and is passed together with gasification agents, which preferably contain no free oxygen, such as steam or carbon dioxide, over a layer of reactive fuel, e.g. lignite coke. By the consumption of sensible heat for the gasification, cooling and condensation of the vapours is attained and the reactive fuel filters off the injurious substances.

If desired or required, it may also be advantageous to utilize the sensible heat of the gases from the preheating zone for coking the charge material, which then travels further to the heating zone proper for graphitizing. The vapours escaping with the gas are condensed in known manner. In this operation, the volatile substances formed from the ashes are also deposited and the gases of degasification formed, which are mixed with the fresh gas produced, are employed along with it in the gas cycle. If, in this way, too high a content of methane is produced in the circulating gas, which would lead to undesirable depositions of soot or carbon black in the cooling back zone of the furance, in accordance with the invention, a portion of the mixture of fresh gas and degasification gas which has been freed of tars, is introduced into the preheating zone of the furnace at a level at which the charge has a temperature of at least 1200° C. The production of carbon deposit or soot or carbon black from the methane by decomposition is compensated by a decrease in the formation of carbon black or soot by a regulation of the ratio of gasification agent to fuel in the gas producer.

It has further proved to be advantageous to maintain the gas to be passed from the preheating zone to the cooling back zone as dry as possible, in order to prevent formation of water gas and the transport of undecomposed water vapour into the heating zone with the inherent consumption of heat and loss of temperature. To this end, if desired or required, the gas to be introduced into the cooling back zone may be dried by suitable known methods, e. g. by cooling to low temperatures or by the use of desiccants.

The invention will be further described with reference to the accompanying diagrammatic drawing which illustrates in vertical section two embodiments of apparatus employed in accordance with the invention.

In Fig. 1 of the drawing, an embodiment is illustrated in which a cyclone chamber 4, which is cooled with cooling tubes is employed as the producer of fresh gas.

Fuel and gasifying agents are introduced to this chamber tangentially through the nozzles 5 and 6. The fresh gas produced enters into the heating zone 2 of the furnace and is here mixed with the gas stream rising up from the cooling back zone 3. In this way it heats up the charge in the heating zone and flows upwards into the preheating zone 1 where it heats up the charge sliding downwards and is thereby itself cooled down. The gas from the preheating zone leaves the furnace at 7 and, if desired or required, after further cooling and purification, is recycled to the cooling back zone 3 at 8. Gas containing vapourized ash constituents may be removed from the furnace through the effluent pipe 9 and after being partly cooled and being purified, is re-cycled to the furnace through the pipe 10.

The material to be treated is charged to the furnace through the charging lock 11 and is removed through the discharging lock 12. The cyclone gas producer is provided for the removal of any liquid slag coming from the fuel with a slag removal device 13 which carries the slag away in a granulated form.

The furnace is constructed of ceramic material 15 and is lined with carbon material 14 in those parts which are subjected to the highest temperatures.

In Fig. 2, an embodiment of the invention is illustrated in which the producer of fresh gas is in the form of a slagging gas producer 4. Fresh gas is produced in the said producer by the action of a gasification agent introduced at 5 on a portion of the carbonaceous charge to the system.

The manner of operation is in principle the same as that employed in accordance with Fig. 1 except that the preheating zone 1 is employed for coking cokable constituents of the carbonaceous material fed to the furnace. In this case, tar vapours or devolatilization gas are produced in the preheating zone, which mix with the gas passing the preheating zone.

The vapours are condensed during the cooling and purification of the gas. If, however, too high a content of methane occurs in the circulating gas arising from the degasification gas, this could cause undesirable deposition of soot or carbon black in the cooling back zone. In this case, a portion of the gas issuing from the preheating zone, after cooling and purification, is re-cycled to the furnace through pipe 16, in order to decompose the methane component in the preheating zone at a temperature exceeding 1200° C.

I claim:

1. A process for graphitizing solid carbonaceous residues resulting from the thermal decomposition of carbonaceous materials comprising the steps of passing the solid carbonaceous residue to be graphitized in succession through a preheating zone having an inlet end, a heating and graphitizing zone and a cooling zone having an outlet end, all of said zones being located in a furnace in which the heating and graphitizing zone of the furnace is lined with carbon material resistant to the action of hot combustible reducing gases, producing hot combustible reducing gases outside the furnace for heating the solid carbonaceous residues by interacting oxygen with carbonaceous material at temperatures above 1600° C., passing the resulting hot fresh heating gases into the furnace in the heating and graphitizing zone and into direct contact with solid carbonaceous residue therein, said heating gases comprising hot combustible gases having a reducing action and a temperature above 1600° C. sufficient to effect graphitization of said carbonaceous residue in the heating and graphitizing zone, passing the hot combustible reducing gases introduced into the furnace through the heating and graphitizing zone in a direction countercurrent to the passage of the carbonaceous residue to be graphitized and in direct contact therewith and effecting graphitization thereof, passing the hot gases leaving the heating and graphitizing zone through the preheating zone in contact with the carbonaceous residue therein and preheating the carbonaceous residue to be graphitized and cooling the gases contacted therewith, and discharging the combustible reducing gases contacted with the residue in the preheating zone from its inlet end and introducing them into the outlet end portion of the cooling zone in contact with the graphitized material passing therethrough and thereby effecting cooling of the hot graphitized material with the combustible reducing gases.

2. A process for graphitizing solid carbonaceous residues as claimed in claim 1, in which the heating gases are produced in the presence of an excess of fuel and contain constituents adapted to deposit a small proportion of carbon black on the solid carbonaceous residue being graphitized in the heating and graphitizing zone.

3. A process for graphitizing solid carbonaceous residue as claimed in claim 1, in which the combustible reducing gases discharged from the inlet end of the preheating zone contain volatalized ash constituents, purifying said discharged gases for the removal of said volatalized ash constituents therefrom, and thereafter introducing the purified gases into the outlet end portion of the cooling zone of the furnace.

4. A process for graphitizing solid carbonaceous residues resulting from the thermal decomposition of carbonaceous materials comprising the steps of passing a carbonaceous material into and through a preheating and decomposing zone from its inlet end to produce a solid carbonaceous residue to be graphitized, passing the resulting solid carbonaceous residue into and through a heating and graphitizing zone to produce a graphitized residue, and passing said graphitized residue into and through a cooling zone having an outlet end, all of said zones being located in a furnace in which the heating and graphitizing zone of the furnace is lined with carbon material resistant to the action of hot combustible reducing gases, producing hot combustible reducing gases outside the furnace for heating the solid carbonaceous residues by interacting oxygen with carbonaceous material at temperatures above 1600° C., passing the resulting hot fresh heating gases into the furnace in the heating and graphitizing zone and into direct contact with solid carbonaceous residue therein, said heating gases consisting of hot combustible gases having a reducing action and a temperature above 1600° C. sufficient to effect graphitization of said carbonaceous residue in the heating and graphitizing zone, passing the hot combustible reducing gases introduced into the furnace through the heating and graphitizing zone in a direction countercurrent to the passage of the solid carbonaceous residue to be graphitized and in direct contact therewith and effecting graphitization thereof, and passing the hot gases leaving the heating and graphitizing zone through the preheating zone in contact with the carbonaceous material therein and preheating and decomposing the carbonaceous material while simultaneously cooling the gases contacted therewith, thereby producing the solid carbonaceous residue to be graphitized in the heating and graphitizing zone.

5. A process as claimed in claim 4, in which the gases after passing through the preheating zone contain methane, discharging the gases containing methane from the inlet end portion of the preheating zone and introducing a portion of the discharged gases containing methane into the furnace at a point where the temperature of the carbonaceous charge therein is at least 1200° C. and cracking the introduced methane content of the gases in contact with the carbonaceous charge in the furnace.

References Cited in the file of this patent

UNITED STATES PATENTS

| | | |
|---|---|---|
| 1,789,380 | Edwards et al. | Jan. 20, 1931 |
| 1,838,622 | Herrick | Dec. 29, 1931 |
| 1,975,259 | Derby | Oct. 2, 1934 |
| 2,634,198 | Kalboch | Apr. 7, 1953 |
| 2,689,787 | Ogorzaly et al. | Sept. 21, 1954 |
| 2,710,828 | Scott | June 14, 1955 |

FOREIGN PATENTS

| | | |
|---|---|---|
| 513,596 | Germany | Nov. 29, 1930 |
| 515,904 | Canada | Aug. 23, 1955 |